US009051912B2

(12) United States Patent
Makino

(10) Patent No.: US 9,051,912 B2
(45) Date of Patent: Jun. 9, 2015

(54) PRE-IGNITION ESTIMATION CONTROL DEVICE FOR INTERNAL COMBUSTION ENGINE

(75) Inventor: Tomokazu Makino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 918 days.

(21) Appl. No.: 13/252,785

(22) Filed: Oct. 4, 2011

(65) Prior Publication Data

US 2012/0277983 A1 Nov. 1, 2012

(30) Foreign Application Priority Data

Apr. 27, 2011 (JP) ................................. 2011-99283

(51) Int. Cl.
*F02D 28/00* (2006.01)
*F02N 11/08* (2006.01)
*F02D 35/02* (2006.01)
*F02D 41/00* (2006.01)
*F02D 41/24* (2006.01)

(52) U.S. Cl.
CPC .......... *F02N 11/0818* (2013.01); *F02D 35/027* (2013.01); *F02D 41/0025* (2013.01); *F02D 41/2451* (2013.01); *F02D 2200/021* (2013.01); *F02D 2200/0414* (2013.01); *F02D 2200/0611* (2013.01); *F02D 2200/0612* (2013.01); *Y02T 10/48* (2013.01)

(58) Field of Classification Search
CPC . F02D 41/06; F02D 41/0025; F02D 41/2451; F02D 2200/0414; F02D 2200/0612; F02D 2200/021; F02D 2200/0611; F02N 11/0818; Y02T 10/48

USPC .............................. 123/179.3, 179.4; 701/113
See application file for complete search history.

(56) References Cited

U.S. PATENT DOCUMENTS

| 2002/0134356 | A1* | 9/2002 | Frelund et al. ................. 123/479 |
| 2010/0042311 | A1* | 2/2010 | Nakai ............................ 701/112 |
| 2010/0191440 | A1* | 7/2010 | Iwatani ......................... 701/103 |
| 2010/0224141 | A1* | 9/2010 | Nakada .......................... 701/113 |
| 2011/0144891 | A1* | 6/2011 | Nakamura et al. ............. 701/104 |

FOREIGN PATENT DOCUMENTS

| JP | 2007-120448 A | 5/2007 |
| JP | 2009-114973 A | 5/2009 |

* cited by examiner

*Primary Examiner* — Hieu T Vo
*Assistant Examiner* — Arnold Castro
(74) *Attorney, Agent, or Firm* — Sughrue Mion, PLLC; Richard C. Turner

(57) ABSTRACT

An octane rating estimating section estimates the octane rating of fuel on the basis of detection signals from intake air temperature, water temperature, fuel and knock sensors. A pre-ignition occurrence index calculating section calculates a pre-ignition occurrence index on the basis of the estimated octane rating; and a pre-ignition occurrence index correcting section corrects the pre-ignition occurrence index such that pre-ignition occurs more easily. An automatic idling stopping determining section determines automatic idling stopping on the basis of a determination result of an automatic idling stopping prohibition determining section which determines the prohibition of automatic idling stopping on the basis of the pre-ignition occurrence index, an operation signal from the air conditioner, and steering information; and a fuel injection control section which controls fuel injection per the automatic idling stopping determination result.

7 Claims, 14 Drawing Sheets

FIG. 2

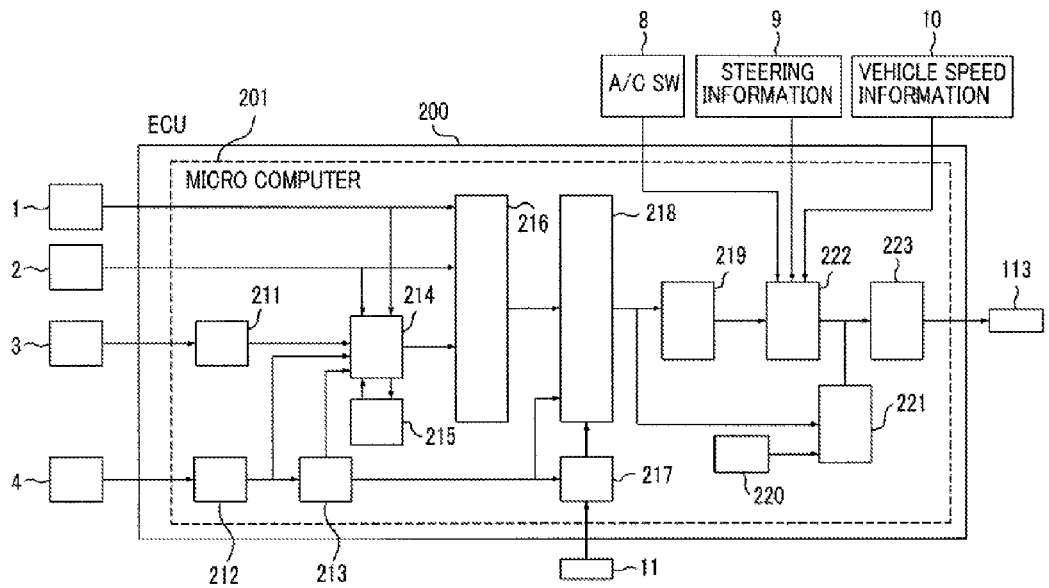

| Legend | |
|---|---|
| Number | Element |
| 1 | detection signal from intake air temperature sensor |
| 2 | detection signal from water temperature sensor |
| 3 | detection signal from fuel sensor |
| 4 | detection signal from knock sensor |
| 11 | ignition switch |
| 113 | fuel injection valve |
| 200 | electronic control unit |
| 211 | oil feed determining section |
| 212 | knock determining section |
| 213 | pre-ignition detecting section |
| 214 | octane rating estimating section |
| 215 | octane rating estimate storage section |
| 216 | pre-ignition occurrence index calculating section |
| 217 | pre-ignition storage section |
| 218 | pre-ignition occurrence index correcting section |
| 219 | automatic idling stopping prohibition determining section |
| 220 | timer for elapsed time after automatic idling stopping |
| 221 | fuel injection timing at the time of start-up determining section |
| 222 | automatic idling stopping determining section |
| 223 | fuel injection control section |

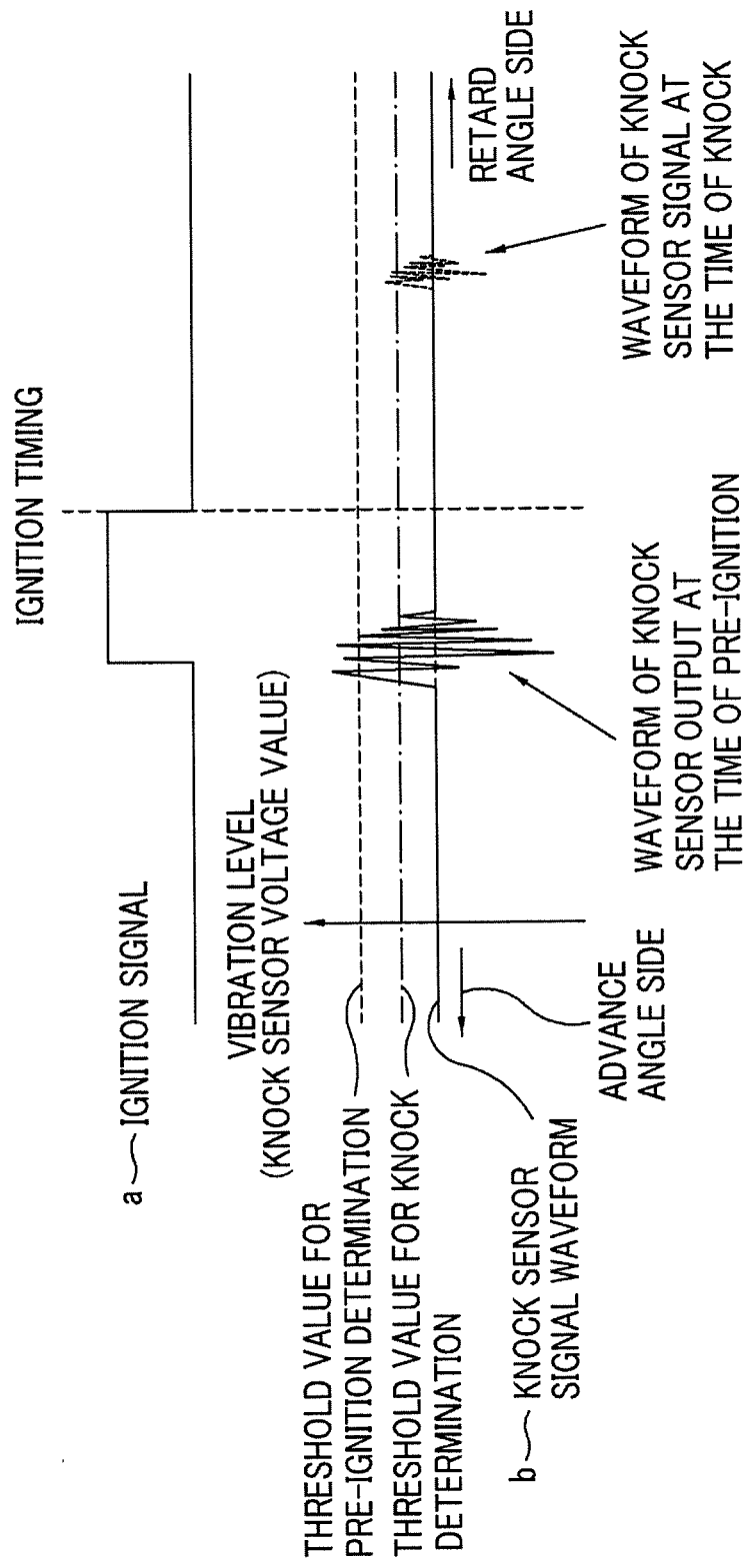

FIG. 7

| INTAKE AIR TEMPERATURE [°C] | 20 | 30 | 40 | 50 | 60 |
|---|---|---|---|---|---|
| PRE-IGNITION OCCURRENCE INDEX | −10 | −5 | 0 | 10 | 20 |

FIG. 8

| WATER TEMPERATURE [°C] | 80 | 90 | 100 | 110 | 120 |
|---|---|---|---|---|---|
| PRE-IGNITION OCCURRENCE INDEX | −10 | 0 | 10 | 15 | 20 |

FIG. 9

| OCTANE RATING [Ron] | 80 | 85 | 90 | 95 | 100 |
|---|---|---|---|---|---|
| PRE-IGNITION OCCURRENCE INDEX | 20 | 10 | 0 | 0 | -5 |

FIG. 10

| CONDITIONS | AUTOMATIC STOPPING PROHIBITION THRESHOLD VALUE | NEXT FUEL INTECION TIMING CHANGE THRESHOLD VALUE |
|---|---|---|
| PRE-IGNITION OCCURRENCE INDEX | 30 | 20 |

FIG. 15

| COMPRESSION TOP DEAD CENTER CYLINDER | #1 CYLINDER | #2 CYLINDER | #3 CYLINDER | #4 CYLINDER |
|---|---|---|---|---|
| NUMBER OF CRANK ANGLE SENSOR REFERENCE SIGNALS | 1 | 2 | 2 | 1 |
| NUMBER OF PHASE ANGLE SENSOR REFERENCE SIGNALS | 1 | 1 | 2 | 2 |

PRE-IGNITION ESTIMATION CONTROL DEVICE FOR INTERNAL COMBUSTION ENGINE

BACKGROUND OF THE INVENTION

1. Field of the Invention

The present invention relates to a pre-ignition estimation control device for an internal combustion engine which is mounted in a vehicle or the like in order to prevent pre-ignition at the time of idling stopping for stopping a vehicle automatically.

2. Background Art

In a spark ignition type internal combustion engine with a high compression ratio, pre-ignition which causes combustion noise or an output fluctuation may occur. The pre-ignition refers to a phenomenon in which a pressure fluctuation in a combustion chamber of the internal combustion engine caused by combustion becomes excessively large. Generally, pre-ignition occurring before spark ignition is known. In addition to this pre-ignition, there is also a phenomenon, such as pre-ignition in which the temperature of the air-fuel mixture (mixed gas of air and fuel) in the combustion chamber becomes high by compression and the air-fuel mixture self-ignites as a result, or pre-ignition in which the tip of a spark plug, a deposit, or the like becomes a hot spot causing ignition. In addition, knocking in which end gas around the combustion chamber self-ignites in a combustion process after ignition is also known.

Such phenomena may not only cause noise or vibration but also damage the combustion chamber of the internal combustion engine and as a result, the internal combustion engine may stop operating eventually. In addition, it is known that pre-ignition frequently occurs at the starting of the engine.

For this reason, methods of preventing pre-ignition by estimating the occurrence of pre-ignition from environmental conditions or operating conditions have been proposed.

One of the known pre-ignition preventing methods is to prevent pre-ignition at the starting of the engine by determining pre-ignition, which occurs at high temperature under the low rotation speed and the high load, from the temperature and the operating state of the internal combustion engine and reducing the actual compression ratio according to the temperature increase (for example, refer to Patent Document 1).

Moreover, as a method of preventing pre-ignition at the time of idling stopping (automatic idling stopping), a self-ignition occurrence region is set with the engine temperature information as a parameter, and the temperature information is acquired and at the same time it is determined whether or not the value of the acquired temperature information is within the self-ignition occurrence region. Then, the engine is immediately restarted when it is determined that the value of the acquired temperature information is within the self-ignition occurrence region during automatic stopping of the engine, and the cooling device stops after automatic idling stopping. In this way, the occurrence of pre-ignition at the restarting of the engine is prevented (for example, refer to Patent Document 2).

[Patent Document 1] JP-A-2009-114973
[Patent Document 2] JP-A-2007-120448

Patent Document 1 discloses that pre-ignition at the starting of the engine is prevented by determining the ease of occurrence of pre-ignition and setting the actual compression ratio according to this at the starting of the engine. In the method disclosed in Patent Document 1, however, the intake-air temperature, the coolant temperature, and the octane rating of fuel are assumed in regard to the ease of occurrence of pre-ignition, but these are considered independently. That is, the ease of occurrence of pre-ignition under complex conditions including the above is not taken into consideration. Since there are many conditions in which pre-ignition occurs easily, it is necessary to set indices related to the ease of occurrence of pre-ignition in consideration of each of these conditions. In particular, at the restarting of the engine after automatic idling stopping, the occurrence of pre-ignition becomes especially easy since the engine is started at the high engine temperature.

Patent Document 2 discloses a method of determining the ease of occurrence of pre-ignition on the basis of the temperature. A temperature at which pre-ignition may occur when a fuel with a high octane rating is used is different from that when a fuel with a low octane rating is used. Accordingly, the temperature set on the assumption that a fuel with a high octane rating is used is too high for a fuel with a low octane rating. As a result, pre-ignition may occur. On the contrary, the temperature set on the assumption that a fuel with a low octane rating is used is too low for a fuel with a high octane rating. As a result, it may be determined that a possibility of the occurrence of pre-ignition is low.

SUMMARY OF THE INVENTION

The invention has been made to solve the above problems, and it is an object of the invention to provide a pre-ignition estimation control device for an internal combustion engine capable of preventing pre-ignition at the restarting of the engine by calculating a pre-ignition occurrence index indicating the ease of occurrence of pre-ignition from the intake air temperature, the coolant temperature, and the octane rating of fuel in all operating states and determining whether to perform automatic idling stopping according to the pre-ignition occurrence index.

According to an aspect of the invention, a pre-ignition estimation control device for an internal combustion engine which is applied to a spark ignition type internal combustion engine and which stops the internal combustion engine automatically when predetermined stopping conditions are satisfied and restarts the internal combustion engine when predetermined restart conditions are satisfied includes: an intake air temperature sensor which detects a temperature of intake air introduced into a combustion chamber; a water temperature sensor which detects a coolant temperature of the internal combustion engine; oil detecting means for detecting fuel supply; knock detecting means for detecting a change of the internal combustion engine caused by knock and pre-ignition; octane rating estimating means for estimating an octane rating of fuel on the basis of detection signals from the intake air temperature sensor, the water temperature sensor, the oil detecting means, and the knock detecting means; a pre-ignition occurrence index calculating section which calculates a total pre-ignition occurrence index on the basis of the detection signals from the intake air temperature sensor and the water temperature sensor and the octane rating estimated by the octane rating estimating means; a pre-ignition occurrence index correcting section which corrects the total pre-ignition occurrence index such that pre-ignition occurs more easily when pre-ignition is detected; and automatic idling stopping determining means for determining whether to stop the engine automatically on the basis of the total pre-ignition occurrence index calculated by the pre-ignition occurrence index correcting section.

According to the pre-ignition estimation control device for an internal combustion engine according to the aspect of the invention, automatic idling stopping is prohibited on the basis of the pre-ignition occurrence index. Therefore, pre-ignition at the restarting of the engine after automatic idling stopping can be prevented.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a block diagram showing the configuration of the pre-ignition estimation control device for an internal combustion engine according to the first embodiment of the invention;

FIG. 5 is a timing chart showing an ignition signal and a detection signal of a knock sensor of the pre-ignition estimation control device for an internal combustion engine according to the first embodiment of the invention;

FIG. 7 is a view showing an "intake air temperature-pre-ignition occurrence index" table;

FIG. 8 is a view showing a "water temperature-pre-ignition occurrence index" table;

FIG. 9 is a view showing an "octane rating-pre-ignition occurrence index" table;

FIG. 10 is a view showing an automatic idling stopping prohibition threshold value and a next fuel injection timing change threshold value;

FIG. 15 is a view showing a combination table of a crank angle reference signal and a phase angle reference signal for determining the number of cylinders.

DETAILED DESCRIPTION OF THE INVENTION

Hereinafter, a pre-ignition estimation control device for an internal combustion engine according to a preferred embodiment of the invention will be described with reference to the accompanying drawings.

First Embodiment

Figure 1:
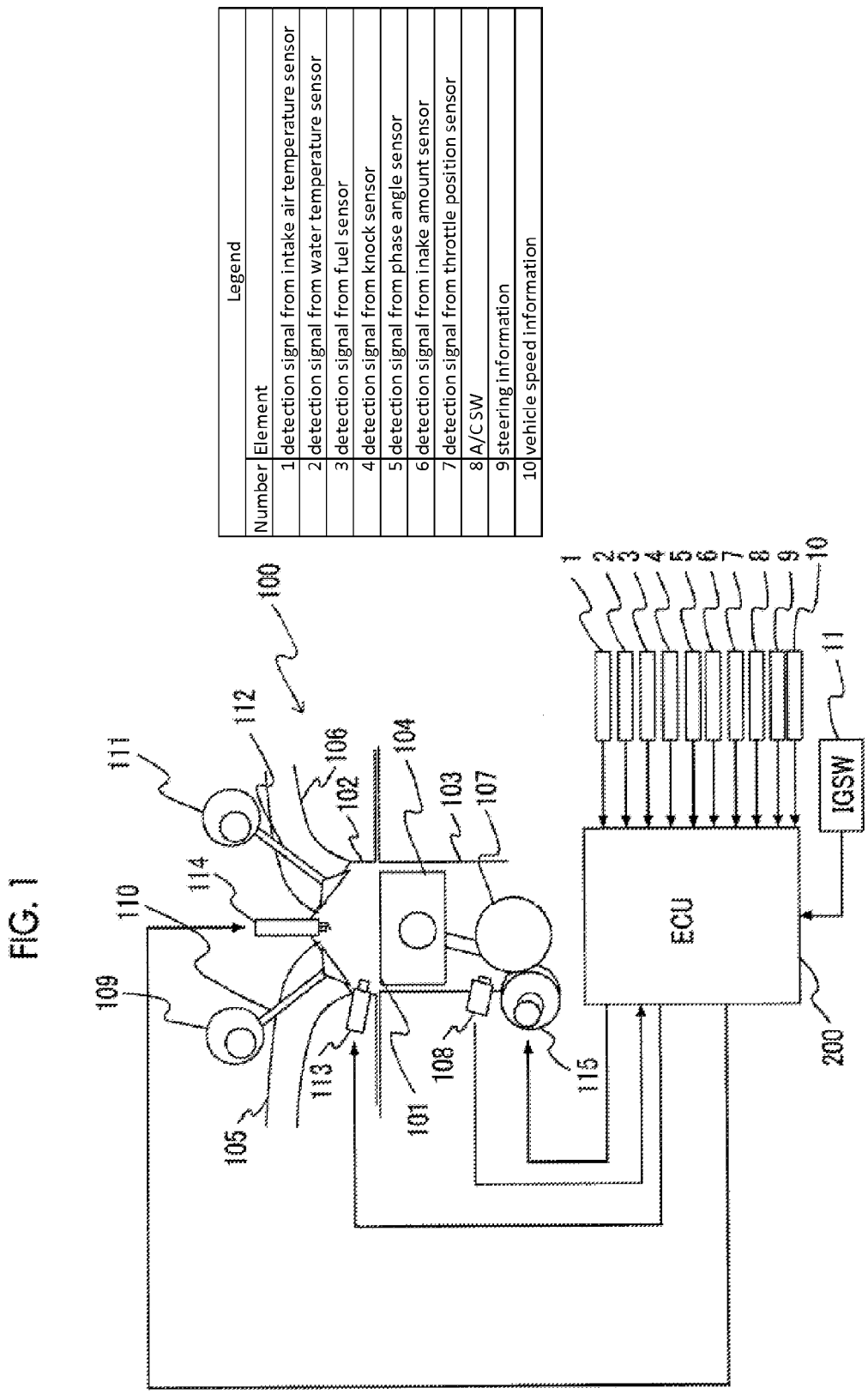
FIG. 1 is a view showing an internal combustion engine including a pre-ignition estimation control device for an internal combustion engine according to a first embodiment of the invention.

A pre-ignition estimation control device for an internal combustion engine according to a first embodiment of the invention will be described with reference to FIGS. 1 to 13. FIG. 1 is a view showing a control device for an internal combustion engine according to the first embodiment of the invention. In addition, like numbers in drawings refer to like parts or equivalent parts.

In FIG. 1, a combustion chamber 101 of an internal combustion engine 100 is configured to include a cylinder head 102, a cylinder block 103, and a piston 104.

In addition, an intake port 105 and an exhaust port 106 are connected to the combustion chamber 101, and the intake port 105 and the exhaust port 106 are formed in the cylinder head 102.

A crankshaft 107 is connected to the piston 104, and the piston 104 moves up and down to rotate the crankshaft 107. A crank plate (not shown) is attached to the crankshaft 107. This crank plate has a projection, and a crank angle sensor 108 detects the number of revolutions and the crank angle position of the crankshaft 107 by detecting the projection. A starter 115 rotates at the starting of the internal combustion engine to rotate a flywheel (not shown). Since the flywheel and the crankshaft 107 are connected to each other, the crankshaft 107 is rotated by rotation of the flywheel.

An intake valve 110 which operates by an intake cam 109 is provided at the combustion chamber 101 side of the intake port 105, and an exhaust valve 112 which operates by an exhaust cam 111 is provided at the combustion chamber 101 side of the exhaust port 106. A fuel injection valve 113 is provided below the intake port 105 of the cylinder head 102, and an ignition plug 114 is provided in the middle of an upper part of the combustion chamber 101.

A combustion cycle will be described briefly. First, in the intake stroke, air introduced from the intake port 105 into the combustion chamber 101 through the intake valve 110 and fuel injected from the fuel injection valve 113 form the air-fuel mixture. Then, in the compression stroke, the air-fuel mixture is compressed by the piston 104. Then, the air-fuel mixture is ignited by the ignition plug 114 near the compression top dead center (TDC). Then, in the expansion stroke, the ignited air-fuel mixture presses the piston 104 down to rotate the crankshaft 107. The air-fuel mixture in the combustion chamber 101 is expanded and is then discharged through the exhaust valve 112 and the exhaust port 106 in the exhaust stroke. The above is a combustion cycle.

Not only the detection signal from the crank angle sensor 108 but also a detection signal from an intake air temperature sensor 1 which detects the temperature of intake air introduced into the combustion chamber 101, a detection signal from a water temperature sensor 2 which detects the coolant temperature of the internal combustion engine 100, a detection signal from an fuel sensor 3 which detects the flow of fuel to a filler (not shown), a detection signal from a knock sensor (knock detecting means) 4 which detects the vibration of the internal combustion engine 100, a detection signal from a phase angle sensor 5 which detects the phase of the intake cam 109, a detection signal from an intake amount sensor 6 which detects the intake amount introduced into the combustion chamber 101, a detection signal from a throttle position sensor 7 which detects a throttle opening, an operation signal 8 of an air conditioner, steering information 9 of a handle, vehicle speed information 10, and the like are input to an electronic control unit (ECU) 200. The electronic control unit 200 executes operations for calculating the rotation speed, ignition timing, the amount of fuel injection, and the like of the internal combustion engine 100. In addition, the electronic control unit 200 starts various kinds of control in response to an ON signal from an ignition switch (IGSW) 11.

FIG. 2 is a block diagram showing the configuration of the pre-ignition estimation control device for an internal combustion engine according to the first embodiment of the invention.

In FIG. 2, the electronic control unit (ECU) 200 includes various kinds of interface (I/F) circuits (not shown) and a microcomputer 201.

The microcomputer 201 includes: an A/D converter which converts analog signals, such as detection signals of various kinds of sensors, into digital signals; a CPU which executes various kinds of control programs, such as a pre-ignition estimation control program; a ROM which stores various kinds of control programs or control parameters, various kinds of tables, and the like; and a RAM which stores variables when executing various kinds of control programs and the like, all of which are not shown in the drawing.

In addition, the microcomputer 201 includes an oil feed determining section 211 which determines whether or not it is immediately after fuel supply on the basis of the detection signal from the fuel sensor 3, a knock detecting section 212 which detects knocking on the basis of a detection signal from the knock sensor 4, and a pre-ignition detecting section 213 which detects pre-ignition on the basis of the detection signal from the knock sensor 4. In addition, the microcomputer 201 includes an octane rating estimating section 214 which estimates the octane rating of fuel on the basis of the information and the detection signals from the intake air temperature sensor 1, the water temperature sensor 2, the oil feed determining section 211, the knock detecting section 212, and the pre-ignition detecting section 213 and an octane rating estimate storage section 215 which stores an octane rating estimate.

In addition, the microcomputer 201 includes a pre-ignition occurrence index calculating section 216 which calculates a pre-ignition occurrence index on the basis of the detection signals from the intake air temperature sensor 1 and the water temperature sensor 2 and the octane rating estimate from the octane rating estimating section 214. In addition, the microcomputer 201 includes a pre-ignition storage section 217, which stores the occurrence of pre-ignition on the basis of the information from the pre-ignition detecting section 213, and a pre-ignition occurrence index correcting section 218, which corrects a pre-ignition occurrence index such that pre-ignition occurs easily on the basis of the information from the pre-ignition detecting section 213, the pre-ignition occurrence index calculating section 216, and the pre-ignition storage section 217.

In addition, the microcomputer 201 includes: an automatic idling stopping prohibition determining section 219 which determines the prohibition of automatic idling stopping on the basis of the pre-ignition occurrence index from the pre-ignition occurrence index correcting section 218; a section for determining a fuel injection timing at the time of start-up (for pre-ignition) 221 which determines a fuel injection timing at the time of start-up on the basis of the pre-ignition occurrence index from the pre-ignition occurrence index correcting section 218 and the information from a timer for elapsed time after automatic idling stopping 220; an automatic idling stopping determining section 222 which determines automatic idling stopping on the basis of a determination result of the automatic idling stopping prohibition determining section 219, the operation signal 8 of the air conditioner, the steering information 9, and the vehicle speed information 10, and a fuel injection control section 223 which controls the fuel injection valve 113.

In addition, the knock detecting section 212 and the pre-ignition detecting section 213 are separately provided for easy understanding. However, both the knock detecting section 212 and the pre-ignition detecting section 213 may be integrally formed as a knock/pre-ignition detecting section. In this case, the knock/pre-ignition detecting section may detect the occurrence of pre-ignition when the vibration level of a detection signal of the knock sensor 4 exceeds a threshold value for pre-ignition determination and detect the occurrence of knock when the vibration level of the detection signal of the knock sensor 4 exceeds a threshold value for knock determination.

The oil feed determining section 211 to the section for determining a fuel injection timing at the time of start-up (for pre-ignition) 221 except for the octane rating estimate storage section 215 and the pre-ignition storage section 217 in the microcomputer 201 are software which forms a pre-ignition estimation control program. The octane rating estimate storage section 215 is a backup memory which holds an octane rating estimate even at the time of power OFF of the ECU 200, and the pre-ignition storage section 217 is a backup memory which holds the occurrence of pre-ignition even at the time of power OFF of the ECU 200.

A table indicating the relationship between the intake air temperature and the pre-ignition occurrence index shown in FIG. 7, a table indicating the relationship between the water temperature and the pre-ignition occurrence index shown in FIG. 8, a table indicating the relationship between the octane rating and the pre-ignition occurrence index shown in FIG. 9, a threshold value of each pre-ignition occurrence index shown in FIG. 10, and the like are stored in advance in the ROM in the microcomputer 201. Optimal values acquired by engine compliance test are set in each table and each map and as each threshold value.

Next, the operation of the pre-ignition estimation control device for an internal combustion engine according to the first embodiment will be described with reference to the accompanying drawings.

First, a method of estimating the octane rating of fuel will be described briefly. Generally, knocking occurs easily as the octane rating becomes low. Therefore, as a method of estimating the octane rating, a method of estimating the octane rating as a low value if the number of times of knock occurring within a predetermined time is equal to or larger than a predetermined number of times may be considered.

Figure 3:
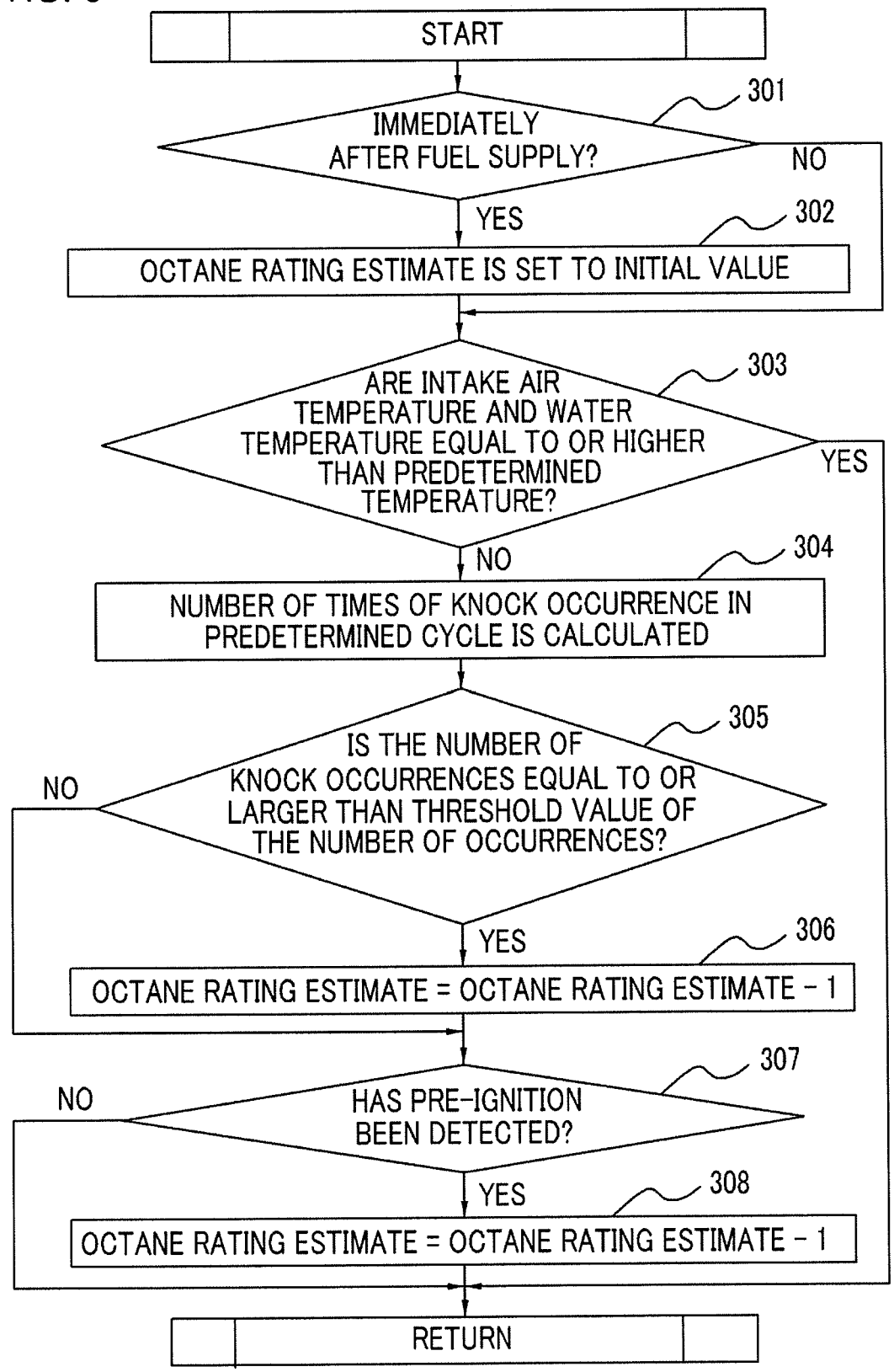
FIG. 3 is a flow chart showing an octane rating estimation operation of the pre-ignition estimation control device for an internal combustion engine according to the first embodiment of the invention.

FIG. 3 is a flow chart showing an octane rating estimation operation of the pre-ignition estimation control device for an internal combustion engine according to the first embodiment of the invention.

This flow chart shown in FIG. 3 includes processing of estimating the octane rating from the frequency of occurrence of knock. This octane rating estimation processing is a processing executed at a timing synchronized with engine rotation (for example, interrupt processing executed every 180 degCA; degCA refers to a crank angle). In step 301, a detection signal from the fuel sensor 3 is input to the oil feed determining section 211, and the oil feed determining section 211 determines whether or not it is immediately after fuel supply. When it is determined that it is immediately after fuel supply, the oil feed determining section 211 transmits the information "immediately after fuel supply" to the octane rating estimating section 214 and proceeds to next step 302. When it is determined that it is not immediately after fuel supply, the oil feed determining section 211 proceeds to step 303.

Figure 4:
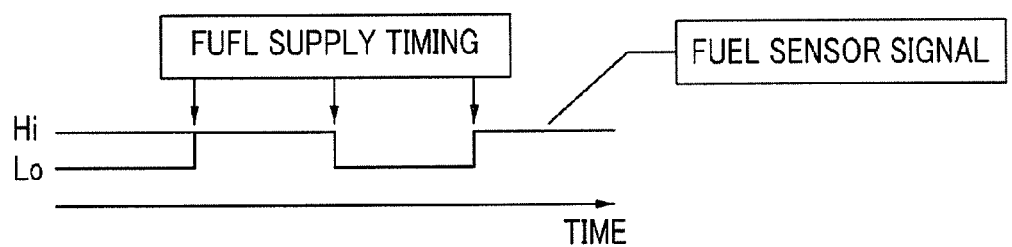
FIG. 4 is a timing chart showing a detection signal of a fuel sensor of the pre-ignition estimation control device for an internal combustion engine according to the first embodiment of the invention.

FIG. 4 is a timing chart showing a detection signal of the fuel sensor of the pre-ignition estimation control device for an internal combustion engine according to the first embodiment of the invention. In FIG. 4, the horizontal axis indicates time, and the vertical axis indicates the level of a detection signal. For example, the fuel sensor 3 is disposed in a filler (not shown), and the detection signal is inverted when it is detected that fuel flows through the filler. The fuel sensor 3 detects the flow of fuel through the filler at the oil feed timing indicated by arrows and changes the detection signal from low (Lo) to high (Hi), for example. It is also possible to use a fuel sensor in which the detection signal changes from Hi to Lo. The oil feed determining section 211 determines whether or not it is immediately after fuel supply by detecting a switching timing of the level of the detection signal of the fuel sensor 3.

Referring back to FIG. 3, in step 302, when the information "immediately after fuel supply" is transmitted from the oil feed determining section 211, the octane rating estimating section 214 sets the octane rating estimate as an initial value and stores it in the octane rating estimate storage section 215.

As the initial value, a value which does not have an effect on the pre-ignition occurrence index is set. For example, an octane rating (for example, 90) at which the pre-ignition occurrence index becomes 0 or an octane rating at which engine compliance test has been performed (value equivalent to regular gasoline in the case of regular gasoline setting) is set. This initial value is stored in advance in the octane rating estimating section 214.

When it is determined that it is "immediately after fuel supply", the octane rating estimating section 214 performs processing of setting the octane rating estimate as an initial value. Accordingly, it becomes unnecessary to use an octane rating estimate before fuel supply. As a result, since it becomes possible to calculate the pre-ignition occurrence index in a state where there is no influence of the octane rating before fuel supply, it is possible to prevent incorrect determination caused by the influence of the octane rating immediately before fuel supply.

Then, in step 303, the octane rating estimating section 214 determines whether or not the intake air temperature and the water temperature are equal to or higher than a predetermined temperature. When the intake air temperature and the water temperature are equal to or higher than a predetermined temperature, the octane rating estimating section 214 transmits the octane rating estimate stored in the octane rating estimate storage section 215 to the pre-ignition occurrence index calculating section 216, and this processing ends. When the intake air temperature and the water temperature are not equal to or higher than a predetermined temperature, the process proceeds to step 304.

When the detection signals from the intake air temperature sensor 1 and the water temperature sensor 2 are input to the octane rating estimating section 214 and the intake air temperature is equal to or higher than an intake air temperature threshold value and the water temperature is equal to or higher than a water temperature threshold value, the octane rating estimating section 214 does not execute update of the octane rating estimate by knock and pre-ignition detection. For example, when the intake air temperature is equal to or higher than 50° C. which is an intake air temperature threshold value and the water temperature is equal to or higher than 110° C. which is a water temperature threshold value, the octane rating estimating section 214 does not execute update of the octane rating estimate. This is because pre-ignition (including knocking) occurs not only when the octane rating is low but also according to the environmental condition and therefore, it is possible to prevent the octane rating estimate from becoming lower than needed.

Then, in step 304, a detection signal from the knock sensor 4 is input to the knock detecting section 212. If the knock detecting section 212 detects knocking, the information "knock detection" is transmitted to the octane rating estimating section 214. In addition, a detection signal from the knock sensor 4 is input to the pre-ignition detecting section 213. If the pre-ignition detecting section 213 detects pre-ignition, the information "pre-ignition detection" is transmitted to the octane rating estimating section 214. The octane rating estimating section 214 calculates the number of knock occurrences in a predetermined cycle by counting the information "knock detection" transmitted from the knock detecting section 212.

FIG. 5 is a timing chart showing an ignition signal and a detection signal of the knock sensor of the pre-ignition estimation control device for an internal combustion engine according to the first embodiment of the invention. In FIG. 5, the horizontal axis indicates time (angle axis), and the left side of ignition timing shown in FIG. 5 is an advance angle side and the right side is a retard angle side. The vertical axis indicates each level of an ignition signal (a) and a knock sensor signal (b) which is detected by the knock sensor 4 (hereinafter, also referred to as a detection signal of a knock sensor). The knock sensor 4 detects the vibration of the internal combustion engine 100 which occurs due to knocking, and converts the vibration into a voltage and outputs it as a detection signal. Accordingly, the waveform of the detection signal of the knock sensor 4 has a vibration level, and the high vibration level indicates large vibration.

The waveform of a detection signal of the knock sensor 4 shown at the advance angle side from the ignition timing shown in FIG. 5 is a knock sensor output waveform at the time of pre-ignition, and the waveform of a detection signal of the knock sensor 4 shown at the retard angle side from the ignition timing is a knock sensor output waveform at the time of knocking. Typically, the knock detecting section 212 sets a threshold value for knock determination (one-dot chain line) and detects the occurrence of knock when the vibration level of the detection signal of the knock sensor 4 exceeds the threshold value for knock determination. In addition, the pre-ignition detecting section 213 sets a threshold value for pre-ignition determination (dotted line), which is a higher level than the threshold value for knock determination, and detects the occurrence of pre-ignition when the vibration level of the detection signal of the knock sensor 4 exceeds the threshold value for pre-ignition determination. This is because it is known that the vibration level of pre-ignition is apparently larger than the vibration level of knocking. Therefore, pre-ignition and knock can be distinguished by the size of a vibration level. Undoubtedly, it is also possible to distinguish the pre-ignition and the knock using other methods.

Referring back to FIG. 3, in step 305 in FIG. 3, the octane rating estimating section 214 determines whether or not the number of knock occurrences in a predetermined cycle is equal to or larger than a threshold value of the number of occurrences. For example, the octane rating estimating section 214 determines whether or not the number of knock occurrences is equal to or larger than 20 times in 100 cycles. When the number of knock occurrences in a predetermined cycle is equal to or larger than the threshold value of the number of occurrences, the process proceeds to next step 306. When the number of knock occurrences in a predetermined cycle is smaller than the threshold value of the number of occurrences, the process proceeds to step 307.

In step 306, the octane rating estimating section 214 updates the octane rating estimate stored in the octane rating estimate storage section 215 to a lower value. For example, the octane rating estimating section 214 updates the current octane rating estimate to a value, which is lower by 1 than the current octane rating estimate, by executing an operation of "new octane rating estimate=current octane rating estimate−1".

Then, in step 307, the octane rating estimating section 214 determines whether or not pre-ignition has been detected. The octane rating estimating section 214 determines whether or not pre-ignition has been detected on the basis of whether or not the information "pre-ignition detection" has been transmitted from the pre-ignition detecting section 213. When pre-ignition has been detected, the process proceeds to next step 308. When pre-ignition has not been detected, the octane rating estimating section 214 transmits the octane rating estimate stored in the octane rating estimate storage section 215 to the pre-ignition occurrence index calculating section 216, and this processing ends.

Then, in step 308, the octane rating estimating section 214 updates the octane rating estimate stored in the octane rating estimate storage section 215 to a lower value. For example, the octane rating estimating section 214 updates the current octane rating estimate to a value, which is lower by 1 than the current octane rating estimate, by executing an operation of "new octane rating estimate=current octane rating estimate−1". In addition, the octane rating estimating section 214 resets the counted number of knock occurrences when pre-ignition has been detected. The octane rating estimating section 214 transmits the octane rating estimate stored in the octane rating estimate storage section 215 to the pre-ignition occurrence index calculating section 216, and this processing ends.

In addition, if pre-ignition is detected, the pre-ignition detecting section 213 also transmits the information "pre-ignition detection" to the pre-ignition storage section 217 and the pre-ignition occurrence index correcting section 218 when transmitting the information "pre-ignition detection" to the octane rating estimating section 214. After the information "pre-ignition detection" is transmitted, the pre-ignition storage section 217 stores the occurrence of pre-ignition and deletes the memory of occurrence of pre-ignition when an OFF signal is input from the IGSW 11. The pre-ignition detection processing is executed every period of 180 degCA including start-up, for example.

It is needless to say that knock or pre-ignition may be detected using other sensors, such as a cylinder inside pressure sensor and a rotation variation sensor, as knock detecting means and the octane rating estimate may be updated. The cylinder inside pressure sensor detects the cylinder inside pressure changing by knock or pre-ignition, converts the cylinder inside pressure into a voltage, and outputs it as a detection signal, similar to the knock sensor 4. In addition, the rotation variation sensor detects the rotation of the internal combustion engine 100 changing by knock or pre-ignition, converts the number of revolutions into a voltage, and outputs it as a detection signal, similar to the knock sensor 4. The knock detecting section 212 detects the occurrence of knock when the level of the detection signal of the cylinder inside pressure sensor or the rotation variation sensor exceeds the threshold value for knock determination. In addition, the pre-ignition detecting section 213 detects the occurrence of pre-ignition when the level of the detection signal of the cylinder inside pressure sensor or the rotation variation sensor exceeds the threshold value for pre-ignition determination.

Figure 6A:
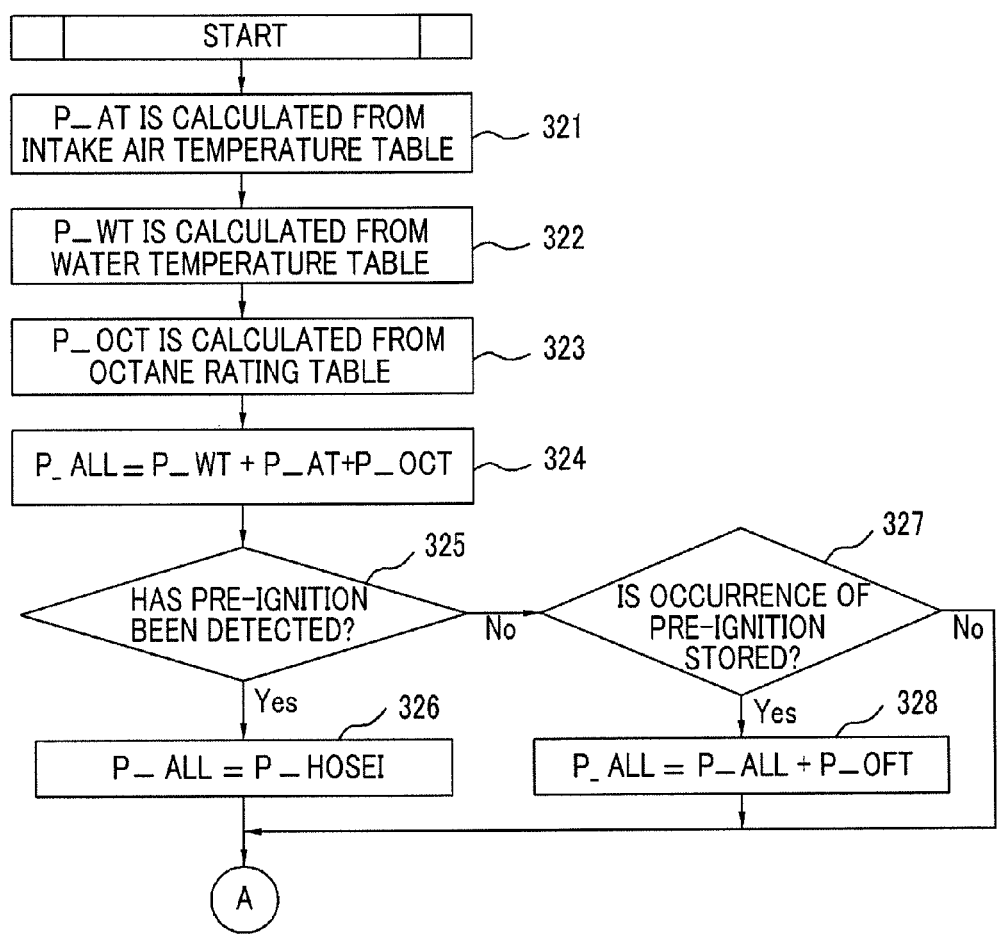
FIGS. 6A and 6B are flow charts showing a pre-ignition occurrence index operation and an automatic idling stopping prohibition determination operation of the pre-ignition estimation control device for an internal combustion engine according to the first embodiment of the invention.
Figure 6B:
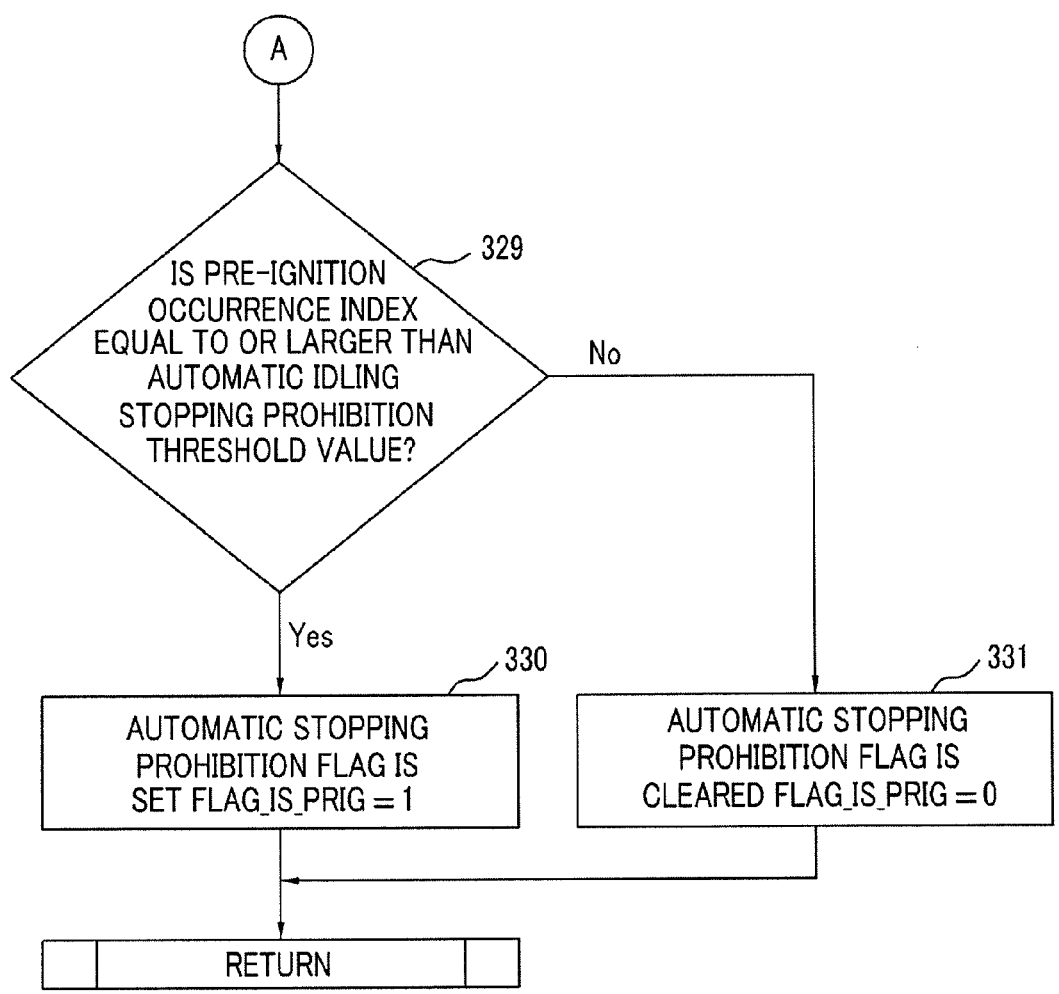

FIGS. 6A and 6B are flow charts showing a pre-ignition occurrence index operation and an automatic idling stopping prohibition flag operation of the pre-ignition estimation control device for an internal combustion engine according to the first embodiment of the invention. The flow charts in FIGS. 6A and 6B include a pre-ignition occurrence index and an automatic idling stopping prohibition flag showing the ease of occurrence of pre-ignition. This processing for operation of the pre-ignition occurrence index and the automatic idling stopping prohibition flag is a processing executed at a timing synchronized with engine rotation (for example, interrupt processing executed every 180 degCA).

In step 321, the pre-ignition occurrence index calculating section 216 receives a detection signal from the intake air temperature sensor 1 to acquire the intake air temperature. Then, the pre-ignition occurrence index calculating section 216 calculates a pre-ignition occurrence index P_AT corresponding to the intake air temperature from an "intake air temperature-pre-ignition occurrence index" table in which the correspondence relationship between the intake air temperature and the pre-ignition occurrence index is described. The "intake air temperature-pre-ignition occurrence index" table shown in FIG. 7 is prepared in advance, and the pre-ignition occurrence index P_AT corresponding to the intake air temperature is calculated. For example, if the intake air temperature is 50° C., the pre-ignition occurrence index P_AT=10 corresponding to the intake air temperature is acquired from the intake air temperature table.

Then, in step 322, the pre-ignition occurrence index calculating section 216 receives a detection signal from the water temperature sensor 2 to acquire the water temperature. Then, the pre-ignition occurrence index calculating section 216 calculates a pre-ignition occurrence index P_WT corresponding to the water temperature from a "water temperature-pre-ignition occurrence index" table in which the correspondence relationship between the water temperature and the pre-ignition occurrence index is described. The "water temperature-pre-ignition occurrence index" table shown in FIG. 8 is prepared in advance, and the pre-ignition occurrence index P_WT corresponding to the water temperature is calculated. For example, if the water temperature is 100°, the pre-ignition occurrence index P_WT=10 corresponding to the water temperature is acquired from the water temperature table.

Then, in step 323, the pre-ignition occurrence index calculating section 216 acquires an estimated octane rating from the Octane rating estimating section 214, and calculates a pre-ignition occurrence index P_OCT corresponding to the octane rating from an "octane rating-pre-ignition occurrence index" table in which the correspondence relationship between the octane rating and the pre-ignition occurrence index is described. The "octane rating-pre-ignition occurrence index" table shown in FIG. 9 is prepared in advance, and the pre-ignition occurrence index P_OCT corresponding to the octane rating is calculated. For example, if the octane rating is 95 [Ron], the pre-ignition occurrence index P_OCT=0 corresponding to the octane rating is acquired from the octane rating table.

Then, in step 324, the pre-ignition occurrence index calculating section 216 calculates a total pre-ignition occurrence index P_ALL by adding each parameter (each pre-ignition occurrence index) calculated in each step described above. The pre-ignition occurrence index calculating section 216 calculates P_ALL=P_AT+P_WT+P_OCT. For example, the total pre-ignition occurrence index P_ALL=10+10+0=20 is acquired.

Here, for the pre-ignition occurrence index calculated from the intake air temperature and the water temperature, a positive value is set in a temperature region where pre-ignition occurs easily and a negative value is set in a temperature region where pre-ignition occurs with difficulty. Moreover, also for the pre-ignition occurrence index calculated from the octane rating, a positive value is set at the octane rating at which pre-ignition occurs easily and a negative value is set at the octane rating at which pre-ignition occurs with difficulty using a predetermined octane rating as a reference (for example, the octane rating of fuel used when doing an engine compliance test). Since a suitable pre-ignition occurrence index can be set for every parameter in this way, control can be executed only when pre-ignition occurs more easily. If other parameters are in a state where pre-ignition does not occur easily even if only one parameter is in a state where pre-ignition occurs easily, it becomes possible to stop idling automatically.

Then, in step 325, the pre-ignition occurrence index correcting section 218 determines whether or not pre-ignition has been detected. The process proceeds to next step 326 when pre-ignition has been detected, and the process proceeds to step 327 when pre-ignition has not been detected. The pre-ignition occurrence index correcting section 218 determines whether or not pre-ignition has been detected on the basis of whether or not the information "pre-ignition detection" has been transmitted from the pre-ignition detecting section 213.

The pre-ignition occurrence index correcting section 218 corrects the pre-ignition occurrence index, which has been calculated by the pre-ignition occurrence index calculating section 216, such that pre-ignition occurs easily only when pre-ignition is detected. In addition, also in a cycle in which pre-ignition is not detected, the pre-ignition occurrence index correcting section 218 corrects the pre-ignition occurrence index such that pre-ignition occurs easily if the occurrence of pre-ignition in the past is stored in the pre-ignition storage section 217.

Then, in step 326, the pre-ignition occurrence index correcting section 218 substitutes a first pre-ignition occurrence index correction value P_HOSEI into the total pre-ignition occurrence index P_ALL. This pre-ignition occurrence index correction value P_HOSEI sets an index which prohibits automatic idling stopping. If the pre-ignition occurrence index which prohibits automatic idling stopping is 30, P_HOSEI=30. Accordingly, P_ALL=P_HOSEI=30. In this way, when there is a request for automatic idling stopping immediately after the occurrence of pre-ignition, automatic stopping can be prohibited.

Then, in step 327, the pre-ignition occurrence index correcting section 218 determines whether or not the pre-ignition storage section 217 stores the occurrence of pre-ignition in the past. The process proceeds to next step 328 when the occurrence of pre-ignition in the past is stored, and the process proceeds to step 329 when the occurrence of pre-ignition in the past is not stored.

Then, in step 328, the pre-ignition occurrence index correcting section 218 calculates a current total pre-ignition occurrence index P_ALL by adding a second pre-ignition occurrence index correction value P_OFT, which is set in advance, to the total pre-ignition occurrence index P_ALL so as to become a pre-ignition occurrence index at which pre-ignition occurs easily. For example, assuming that the pre-ignition occurrence index correction value P_OFT is 10, the current total pre-ignition occurrence index P_ALL is P_ALL=P_ALL+P_OFT=20+10=30.

By storing the previous pre-ignition occurrence and correcting the pre-ignition occurrence index according to whether or not pre-ignition occurred in the past, automatic idling stopping can be prohibited when pre-ignition occurs during traveling. Accordingly, it is possible to reduce a possibility that pre-ignition will occur at the restarting of the engine.

Then, in step 329, the automatic idling stopping prohibition determining section 219 determines whether or not the total pre-ignition occurrence index is equal to or larger than the automatic idling stopping prohibition threshold value. As shown in FIG. 10, the automatic idling stopping prohibition threshold value is set (in the present embodiment, 30).

The total pre-ignition occurrence index P_ALL before the correction in step 324 is P_ALL=20. Accordingly, since the total pre-ignition occurrence index P_ALL is smaller than the automatic idling stopping prohibition threshold value=30, the process proceeds to step 331. In addition, when pre-ignition has been detected in step 325, the process proceeds to step 330 since the total pre-ignition occurrence index P_ALL is P_ALL=30 and accordingly, the total pre-ignition occurrence index P_ALL is equal to the automatic idling stopping prohibition threshold value=30.

In step 330, an automatic stopping prohibition flag FLAG_IS_PRIG is set to 1, and this processing ends. In step 331, the automatic stopping prohibition flag FLAG_IS_PRIG is set to 0, and this processing ends. When the automatic stopping prohibition flag FLAG_IS_PRIG is 1, automatic stopping is prohibited. Pre-ignition at the restarting of the engine is prevented by prohibiting automatic idling stopping. In addition, the automatic stopping prohibition is determined according to the pre-ignition occurrence index. Accordingly, since idling can be automatically stopped when a possibility of the occurrence of pre-ignition is low, fuel efficiency can be improved.

Figure 11:
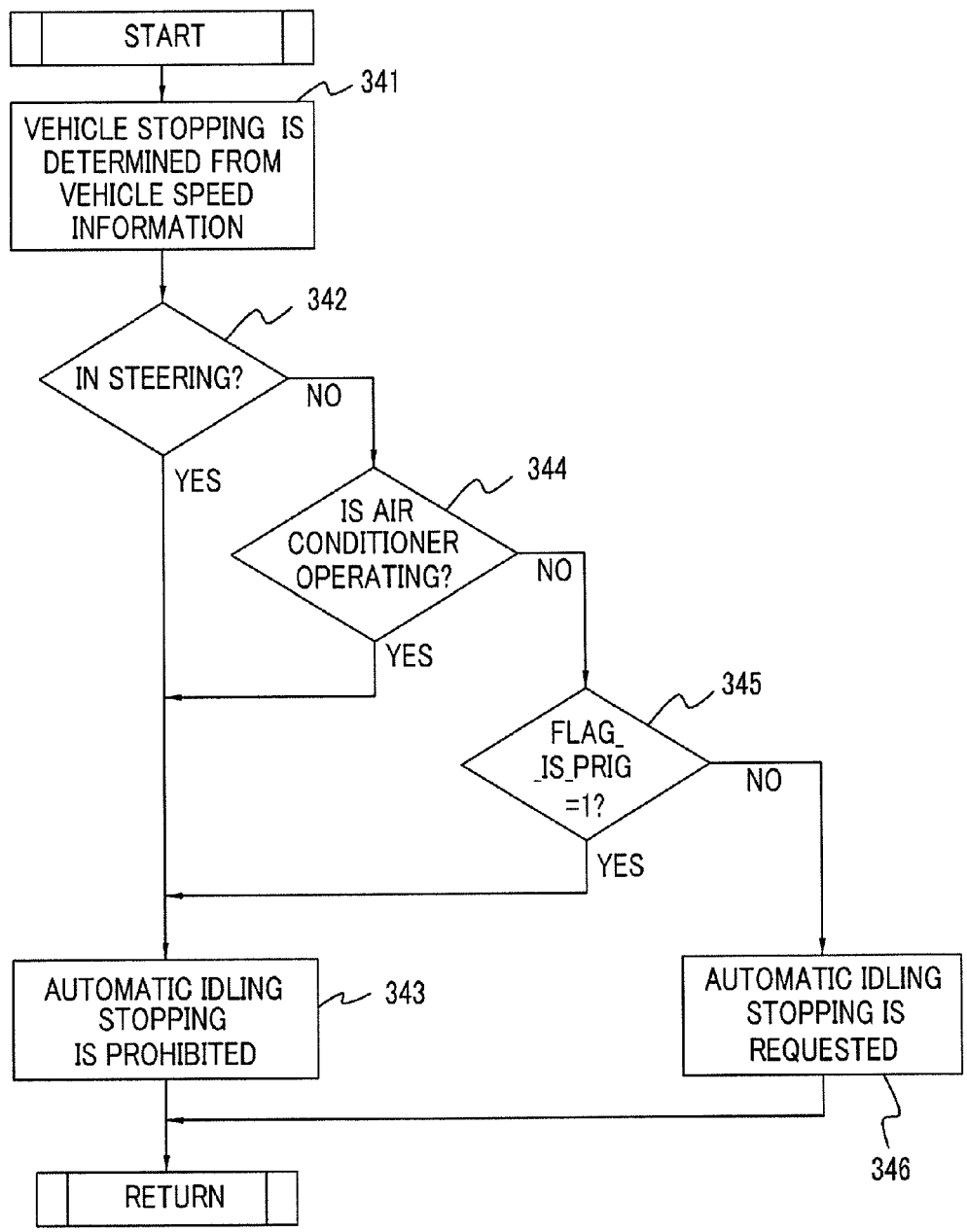
FIG. 11 is a flow chart showing an automatic idling stopping determination operation of the pre-ignition estimation control device for an internal combustion engine according to the first embodiment of the invention.

FIG. 11 is a flow chart showing an automatic idling stopping determination operation of the pre-ignition estimation control device for an internal combustion engine according to the first embodiment of the invention. This processing for operation of the automatic idling stopping determination operation flag is a processing executed at a timing synchronized with engine rotation (for example, interrupt processing executed every 180 degCA).

In step 341, the automatic idling stopping determining section 222 determines that a vehicle has stopped from the vehicle speed information.

Then, in step 342, the automatic idling stopping determining section 222 determines whether or not the vehicle is in steering from the steering information 9. The process proceeds to step 343 if the vehicle is in steering, and the process proceeds to step 344 if the vehicle is not in steering.

Then, in step 343, the automatic idling stopping determining section 222 prohibits a request of automatic idling stopping, and this processing ends.

Then, in step 344, the automatic idling stopping determining section 222 determines whether or not an air conditioner of the vehicle is operating from the air conditioner operation information. The process proceeds to step 343 if the air conditioner of the vehicle is operating, and the process proceeds to step 345 if the air conditioner of the vehicle is not operating.

Then, in step 345, the automatic idling stopping determining section 222 determines whether or not the automatic stopping prohibition flag FLAG_IS_PRIG is 1. The process proceeds to step 343 if the automatic stopping prohibition flag FLAG_IS_PRIG is 1, and the process proceeds to step 346 if the automatic stopping prohibition flag FLAG_IS_PRIG is not 1.

Then, in step 346, the automatic idling stopping determining section 222 sends a request for automatic idling stopping, and this processing ends. As described above, since automatic idling stopping is prohibited from the result of the pre-ignition occurrence index, pre-ignition at the restarting of the engine is prevented.

Figure 12:
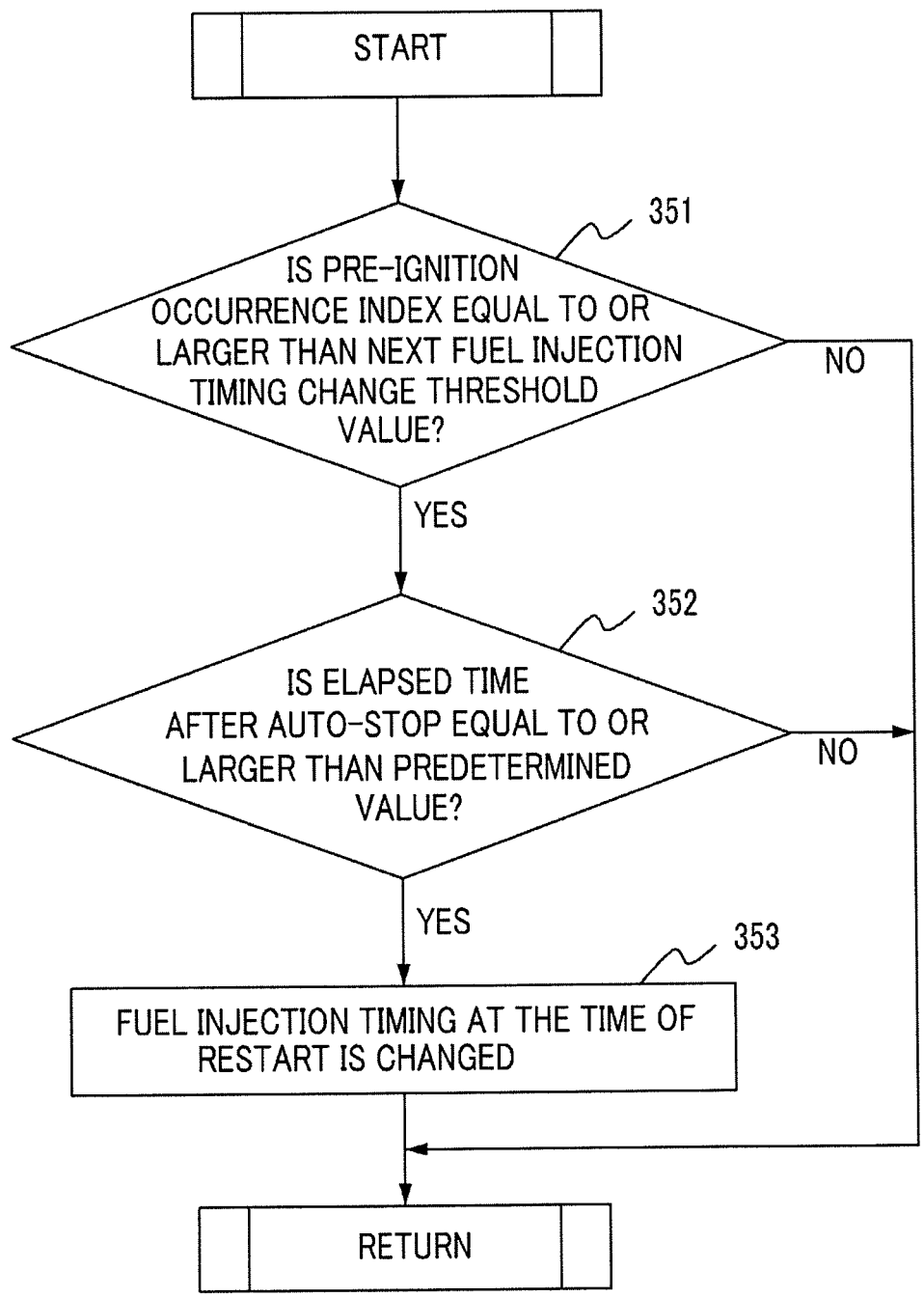
FIG. 12 is a flow chart showing a fuel injection timing setting operation at the restarting of the engine, which is performed by the pre-ignition estimation control device for an internal combustion engine according to the first embodiment of the invention.

FIG. 12 is a flow chart for setting a fuel injection timing at the restarting of the engine in the pre-ignition estimation control device for an internal combustion engine according to the first embodiment of the invention. This processing for setting the fuel injection timing at the restarting of the engine is a processing which is executed every fixed time (for example, interrupt processing executed every 10 ms) by stopping idling.

In step 351, the section for determining a fuel injection timing at the time of start-up (for pre-ignition) 221 receives a restart request based on the brake information (not shown) or the like and determines whether or not the pre-ignition occurrence index is equal to or larger than a next fuel injection timing change threshold value. As shown in FIG. 10, the next fuel injection timing change threshold value is set (in the present embodiment, 20). For example, when the pre-ignition occurrence index is 30, the pre-ignition occurrence index is larger than the next fuel injection timing change threshold value, the process proceeds to step 352. When the pre-ignition occurrence index is 10, the next fuel injection timing is not changed, and this processing ends.

In step 352, the section for determining a fuel injection timing at the time of start-up (for pre-ignition) 221 determines whether or not the timer for elapsed time after automatic idling stopping 220 has a predetermined value or more. If the timer for elapsed time after automatic idling stopping 220 has a predetermined value or more (for example, 3 minutes or more), the process proceeds to step 353. Otherwise, the next fuel injection timing is not changed, and this processing ends. Here, the timer for elapsed time after automatic idling stopping 220 is a timer which measures an elapsed time from the point of time of automatic idling stopping.

In step 353, the section for determining a fuel injection timing at the time of start-up (for pre-ignition) 221 requests the fuel injection control section 223 to change the fuel injection timing at the restarting of the engine, and this processing ends.

Figure 13:
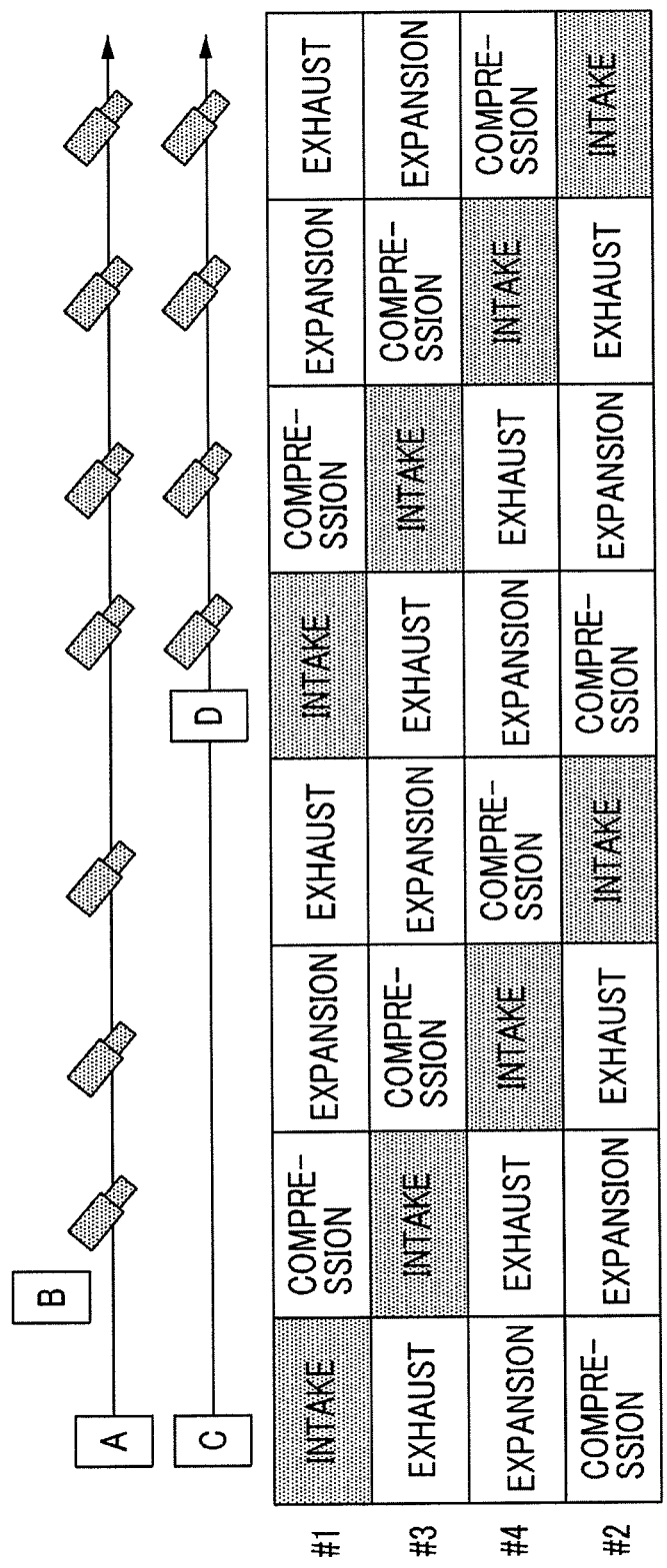
FIG. 13 is a view showing the relationship between a fuel injection timing and a stroke.

A fuel injection timing at the time of start-up requested in this flow chart is shown in FIG. 13. FIG. 13 shows each stroke and fuel injection timing. In FIG. 13, A indicates a fuel injection timing at the time of normal start-up, and fuel injection is started from the intake stroke (B in the drawing) determined after starting of the engine. On the other hand, C in FIG. 13 indicates a fuel injection timing for pre-ignition, and fuel injection is started from the intake stroke (D in the drawing) after one cycle from the intake stroke determined after starting of the engine. In this manner, since fuel injection into the air in a cylinder, which has been warmed by the heat of the engine, during automatic idling stopping does not occur, pre-ignition can be prevented.

Figure 14:
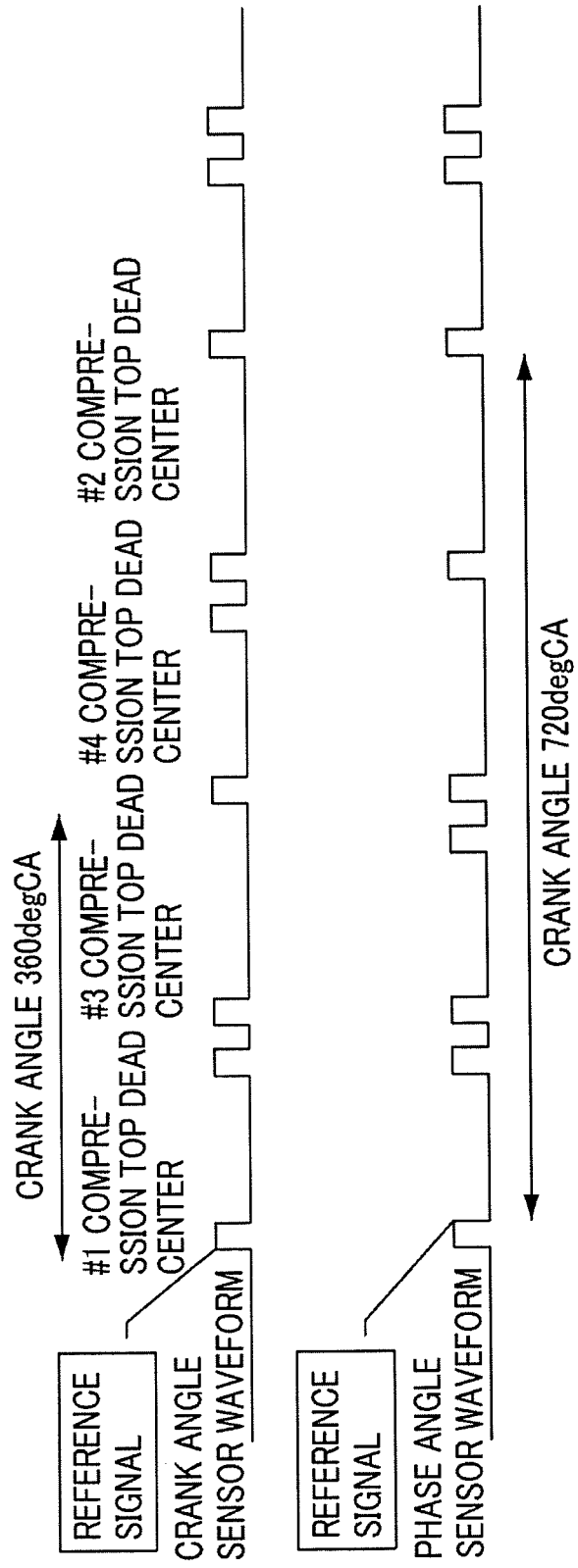
FIG. 14 is a view showing a crank angle sensor waveform and a phase angle sensor waveform for determining the number of cylinders.

Here, the cylinder information used to set the fuel injection timing is determined by combination of a detection signal of the phase angle sensor 5 and a detection signal of the crank angle sensor 108. For example, in the case of a four-cylinder engine, design is made such that a reference signal is input to a phase angle sensor, which rotates once every crank angle of 720°, every crank angle of 180° and a reference signal is input to a crank angle sensor every crank angle of 180°, as shown in FIG. 14. Input of each reference signal is designed to synchronize with the compression top dead center timing of each cylinder. In this case, since the compression top dead center of each cylinder can be determined by combination of a reference signal of the phase angle sensor and a reference signal of the crank angle sensor shown in FIG. 15, it becomes possible to determine the number of cylinders. If the compression top dead center can be determined, the determination can also be made for the other strokes.

Although the pre-ignition estimation control device for an internal combustion engine according to the embodiment of the invention is applied to a direct injection type internal combustion engine, estimation of the pre-ignition occurrence index is also effective for other internal combustion engines, such as a port injection type internal combustion engine.

Various modifications and alterations of this invention will be apparent to those skilled in the art without departing from the scope and spirit of this invention, and it should be understood that this is not limited to the illustrative embodiments set forth herein.

What is claimed is:

1. A pre-ignition estimation control device for an internal combustion engine which is applied to a spark ignition type internal combustion engine and which stops the internal combustion engine automatically when predetermined stopping conditions are satisfied and restarts the internal combustion engine when predetermined restart conditions are satisfied, the pre-ignition estimation control device comprising:
   an intake air temperature sensor which detects a temperature of intake air introduced into a combustion chamber;
   a water temperature sensor which detects a coolant temperature of the internal combustion engine;
   oil detecting means for detecting fuel supply;
   knock detecting means for detecting a change of the internal combustion engine caused by knock and pre-ignition;
   an octane rating estimating section for estimating an octane rating of fuel on the basis of detection signals from the intake air temperature sensor, the water temperature sensor, the oil detecting means, and the knock detecting means;
   a pre-ignition occurrence index calculating section which calculates a total pre-ignition occurrence index on the basis of the detection signals from the intake air temperature sensor and the water temperature sensor and the octane rating estimated by the octane rating estimating section;
   a pre-ignition occurrence index correcting section which corrects the total pre-ignition occurrence index according to whether or not pre-ignition has occurred in the past such that pre-ignition occurs more easily when past pre-ignition is detected; and
   automatic idling stopping determining means for determining whether to stop the engine automatically on the basis of the total pre-ignition occurrence index calculated by the pre-ignition occurrence index correcting section.

2. The pre-ignition estimation control device for an internal combustion engine according to claim 1, further comprising:
   number-of-cylinders determining means for determining the number of cylinders in an intake stroke of the internal combustion engine; and
   a timer which measures a time until the internal combustion engine restarts after the internal combustion engine is stopped by the automatic idling stopping determining means,
   wherein when the pre-ignition occurrence index is equal to or larger than a restart pre-ignition occurrence index and a value of the timer is equal to or larger than a predetermined value, fuel injection is started from a cylinder in the internal combustion engine into which new air has been introduced at the restarting of the internal combustion engine.

3. The pre-ignition estimation control device for an internal combustion engine according to claim 1, comprising:
- an oil feed determining section which determines whether or not it is immediately after fuel supply on the basis of a detection signal from the oil detecting means;
- a knock detecting section which detects knocking on the basis of a detection signal from the knock detecting means;
- a pre-ignition detecting section which detects pre-ignition on the basis of a detection signal from the knock detecting means; and
- an octane rating estimating section which sets an octane rating estimate of fuel to an initial value when the oil feed determining section determines that it is immediately after fuel supply, calculates the number of knock occurrences detected by the knock detecting section, updates the octane rating estimate to a lower value when the number of knock occurrences in a predetermined cycle is equal to or larger than a threshold value of the number of occurrences, updates the octane rating estimate to a lower value and also resets the number of knock occurrences when pre-ignition has been detected by the pre-ignition detecting section, and does not perform update of the octane rating estimate caused by knock detection and pre-ignition detection when the intake air temperature detected by the intake air temperature sensor is equal to or larger than an intake air temperature threshold value and the water temperature detected by the water temperature sensor is equal to or larger than a water temperature threshold value.

4. The pre-ignition estimation control device for an internal combustion engine according to claim 1,
wherein the pre-ignition occurrence index calculating section calculates a first pre-ignition occurrence index from an "intake air temperature-pre-ignition occurrence index" table on the basis of the intake air temperature detected by the intake air temperature sensor, calculates a second pre-ignition occurrence index from a "water temperature-pre-ignition occurrence index" table on the basis of the water temperature detected by the water temperature sensor, calculates a third pre-ignition occurrence index from an "octane rating-pre-ignition occurrence index" table on the basis of the octane rating detected by the octane rating estimating section, and calculates a total pre-ignition occurrence index by adding the first, second, and third pre-ignition occurrence indices.

5. The pre-ignition estimation control device for an internal combustion engine according to claim 4,
wherein in the "intake air temperature-pre-ignition occurrence index" table, a positive value is set as the pre-ignition occurrence index in a temperature region where pre-ignition occurs easily, and a negative value is set as the pre-ignition occurrence index in a temperature region where pre-ignition occurs with difficulty.

6. The pre-ignition estimation control device for an internal combustion engine according to claim 4,
wherein in the "water temperature-pre-ignition occurrence index" table, a positive value is set as the pre-ignition occurrence index in a temperature region where pre-ignition occurs easily, and a negative value is set as the pre-ignition occurrence index in a temperature region where pre-ignition occurs with difficulty.

7. The pre-ignition estimation control device for an internal combustion engine according to claim 3,
wherein in the "octane rating-pre-ignition occurrence index" table, a positive value is set as the pre-ignition occurrence index at an octane rating at which pre-ignition occurs easily, and a negative value is set as the pre-ignition occurrence index at an octane rating at which pre-ignition occurs with difficulty.

* * * * *